United States Patent
Oh et al.

(10) Patent No.: US 11,228,898 B2
(45) Date of Patent: Jan. 18, 2022

(54) DEVICE AND METHOD FOR MULTI-RECEIVE MULTI-SIM

(71) Applicant: SAMSUNG ELECTRONICS CO., LTD., Suwon-si (KR)

(72) Inventors: Choon-seok Oh, Suwon-si (KR); Jun-kyoung Lee, Yongin-si (KR); Chul-kyung Kim, Seoul (KR); Young-yong Lee, Suwon-si (KR); Ju-Young Hyun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 16/511,739

(22) Filed: Jul. 15, 2019

(65) Prior Publication Data
US 2020/0204981 A1 Jun. 25, 2020

(30) Foreign Application Priority Data

Dec. 24, 2018 (KR) .................. 10-2018-0168462

(51) Int. Cl.
*H04W 48/18* (2009.01)
*H04W 8/18* (2009.01)
*H04W 88/06* (2009.01)
*H04W 76/15* (2018.01)

(52) U.S. Cl.
CPC .......... *H04W 8/183* (2013.01); *H04W 48/18* (2013.01); *H04W 76/15* (2018.02); *H04W 88/06* (2013.01)

(58) Field of Classification Search
None
See application file for complete search history.

(56) References Cited

U.S. PATENT DOCUMENTS

| | | |
|---|---|---|
| 5,903,550 A | 5/1999 | Spock |
| 6,330,271 B1 | 12/2001 | Klang et al. |
| 6,515,979 B1 | 2/2003 | Nakayasu |
| 7,039,096 B2 | 5/2006 | Han |
| 8,688,122 B2 | 4/2014 | Mutya et al. |
| 8,761,788 B2 | 6/2014 | Rajurkar et al. |
| 9,338,713 B2 | 5/2016 | Chakravarthy et al. |
| 9,942,873 B2 | 4/2018 | Sebeni et al. |

(Continued)

FOREIGN PATENT DOCUMENTS

| | | |
|---|---|---|
| JP | 3097664 B2 | 10/2000 |
| JP | 4280423 B2 | 6/2009 |

(Continued)

OTHER PUBLICATIONS

Communication dated Feb. 12, 2020 issued by the European Patent Office in counterpart European Patent Application No. 19188778.5.

*Primary Examiner* — Ajit Patel
*Assistant Examiner* — Pamit Kaur
(74) *Attorney, Agent, or Firm* — Sughrue Mion, PLLC

(57) ABSTRACT

A device for multi-receive multi-subscriber identity module (SIM) includes an input buffer configured to provide samples of a baseband signal, a rake receiver including plural fingers and configured to generate a series of symbols from the samples, and a controller configured to assign the fingers to a single SIM in a multi-standby mode and respectively assign two or more finger groups divided from the fingers to two or more SIMs in a multi-receive mode.

18 Claims, 14 Drawing Sheets

(56) References Cited

U.S. PATENT DOCUMENTS

| | | | |
|---|---|---|---|
| 2005/0124343 A1* | 6/2005 | Kubo | H04W 36/18 |
| | | | 455/436 |
| 2013/0343494 A1* | 12/2013 | Bolinth | H04B 1/7115 |
| | | | 375/341 |
| 2016/0029345 A1* | 1/2016 | Sebeni | H04B 1/7115 |
| | | | 370/281 |
| 2016/0142998 A1 | 5/2016 | Tsai et al. | |
| 2016/0277174 A1* | 9/2016 | Burnic | H04B 1/3816 |
| 2017/0094628 A1 | 3/2017 | Miao et al. | |
| 2018/0020464 A1 | 1/2018 | Liang et al. | |

FOREIGN PATENT DOCUMENTS

| | | |
|---|---|---|
| KR | 10-0306455 B1 | 11/2001 |
| KR | 10-0427577 B1 | 4/2004 |
| KR | 10-2014-0114879 A | 9/2014 |
| KR | 10-1534455 B1 | 7/2015 |
| KR | 10-2018-0008237 A | 1/2018 |
| WO | 2016/014928 A1 | 1/2016 |

\* cited by examiner

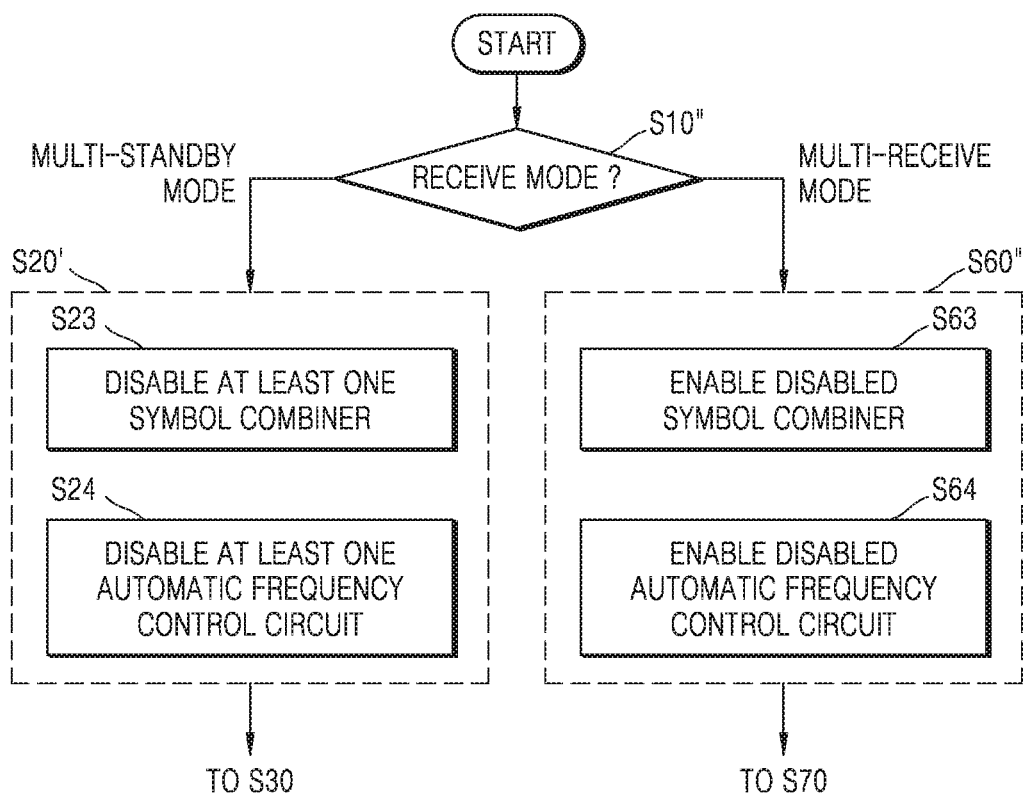

DEVICE AND METHOD FOR MULTI-RECEIVE MULTI-SIM

CROSS-REFERENCE TO RELATED APPLICATION

This application claims priority from Korean Patent Application No. 10-2018-0168462, filed on Dec. 24, 2018, in the Korean Intellectual Property Office, the disclosure of which is incorporated by reference herein in its entirety.

BACKGROUND

1. Field

Apparatuses, devices, and methods consistent with the present disclosure related to wireless communication, and more particularly, to a device and a method for a multi-receive multi-subscriber identity module (SIM).

2. Description of the Related Art

A multi-SIM may enable a terminal to access two different network services. For example, the terminal may include a plurality of SIMs (or a plurality of SIM cards), and the plurality of SIMs may correspond to different accounts and/or telephone numbers, respectively. When the terminal includes radio frequency (RF) resources for driving a plurality of wireless communications corresponding to the plurality of SIMs and implement a plurality of protocol stacks, multi-receive may be possible, and an efficient architecture and method for multi-receive may be required.

SUMMARY

It is an aspect to provide a device and a method for multi-receive in multi-subscriber identity module (SIM) wireless communication.

According to an aspect of an example embodiment, there is provided a device for multi-receive multi-subscriber identity module (SIM), the device including an input buffer configured to provide samples of a baseband signal; a rake receiver comprising a plurality of fingers and configured to generate a series of symbols from the samples; and a controller configured to assign the plurality of fingers to a single SIM of two or more SIMs in a multi-standby mode, and to respectively assign two or more finger groups divided from the plurality of fingers to the two or more SIMs in a multi-receive mode.

According to another aspect of an example embodiment, there is provided a method for multi-receive multi-subscriber identity module (SIM), the method including: determining a multi-standby mode or a multi-receive mode; assigning a plurality of fingers included in a rake receiver to a single SIM among two or more SIMs in the multi-standby mode; and respectively assigning two or more finger groups divided from the plurality of fingers to the two or more SIMs in the multi-receive mode.

According to another aspect of an example embodiment, there is provided a device for multi-receive multi-subscriber identity module (SIM), the device including: an input buffer configured to provide samples of a baseband signal; a rake receiver including a plurality of fingers and configured to generate a series of symbols from the samples; and a controller configured to assign the plurality of fingers to a first SIM or a second SIM in a dual-standby mode and to respectively assign a first finger group and a second finger group divided from the plurality of fingers to the first SIM and the second SIM in a dual-receive mode.

According to another aspect of an example embodiment, there is provided a multi-subscriber identity module (SIM) terminal for multi-receive, the multi-SIM terminal including a plurality of SIMs; a radio frequency integrated circuit (RFIC) configured to generate, from an RF-band signal received through an antenna, a baseband signal corresponding to a single SIM among the plurality of SIMs in a multi-standby mode and baseband signals corresponding to two or more SIMs of the plurality of SIMs in multi-receive mode; and a baseband processor comprising a rake receiver including a plurality of fingers and configured to respectively assign two or more finger groups divided from the plurality of fingers to the two or more SIMs in the multi-receive mode.

BRIEF DESCRIPTION OF THE DRAWINGS

Example embodiments will be more clearly understood from the following detailed description taken in conjunction with the accompanying drawings in which:

FIG. 9 is a flowchart of examples of operations S20 and S60 of FIG. 4, according to an example embodiment;

DETAILED DESCRIPTION

Figure 1:
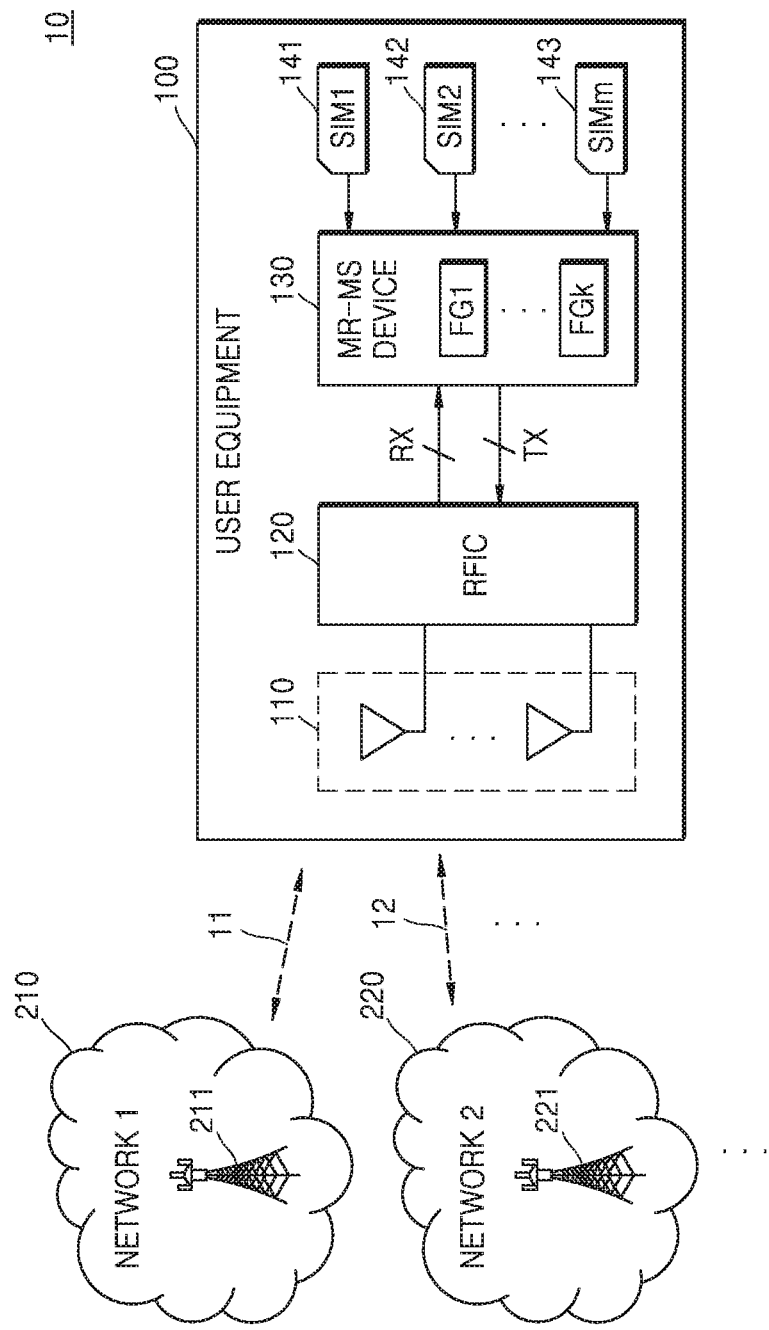
FIG. 1 is a block diagram of a wireless communication system according to an example embodiment.

FIG. 1 is a block diagram of a wireless communication system 10 according to an example embodiment. As shown in FIG. 1, the wireless communication system 10 may include user equipment (UE) 100, a first network 210, a second network 220, and the like.

The UE 100 may be stationary or mobile as a wireless communication device and may be referred to as any device capable of transmitting and receiving data and/or control information to and from a base station (e.g., 211 or 221) through wireless communication. For example, the UE 100 may be referred to as a terminal, terminal equipment, a mobile station (MS), a mobile terminal (MT), a user terminal (UT), a subscriber station (SS), a wireless device, a handheld device, or the like. As shown in FIG. 1, the UE 100 may include an antenna array 110, a radio frequency integrated circuit (RFIC) 120, a multi-receive multi-subscriber identity module (SIM) device (hereinafter, referred to as an MR-MS device) 130, and first to mth SIMS 141, 142, 143 and the like (m is an integer greater than 1).

The base station (e.g., 211 or 221) may be referred to as a fixed station configured to communicate with the UE 100 and/or another base station and may exchange data and control information by communicating with the UE 100 and/or another base station. For example, the base station may be referred to as a Node B, an evolved Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be analyzed as a comprehensive meaning indicating a partial region or function covered by a base station controller (BSC) in Code Division Multiple Access (CDMA), a Node-B in wideband CDMA (WCDMA), an eNB in Long Term Evolution (LTE), a gNB or a sector (site) in fifth generation new radio (5G NR), or the like and may include all of various coverage areas such as mega-cell, macro-cell, micro-cell, pico-cell, femto-cell, relay node, RRH, RU, and small cell communication coverages.

As shown in FIG. 1, a first base station 211 may be included in the first network 210, and a second base station 221 may be included in the second network 220. The UE 100 may access the first network 210 via the first base station 211 and may also access the second network 220 via the second base station 221. The UE 100 may communicate with the first network 210 and the second network 220 according to any radio access technology (RAT). For example, the UE 100 may communicate with the first network 210 and the second network 220 according to, as a non-limited example, a 5G system, a 5G NR system, an LTE system, a VDMA system, a Global System for Mobile Communication (GSM) system, a wireless local area network (WLAN) system, or another any RAT. According to some embodiments, the UE 100 may communicate with the first network 210 and the second network 220 according to the same RAT. According to some embodiments, the UE 100 may communicate with the first network 210 and the second network 220 according to different RATs.

The UE 100 may support multi-SIM (MS) wireless communication. For example, as shown in FIG. 1, the UE 100 may perform first wireless communication 11 with which the first base station 211 and a first SIM 141 are associated, and perform second wireless communication 12 with which the second base station 221 and a second SIM 142 are associated. Particularly, when the two wireless communications, that is, the first wireless communication 11 and the second wireless communication 12, associated with the two SIMs, that is, the first and second SIMs 141 and 142, are performed, the UE 100 may be referred to as a dual-SIM device. The first wireless communication 11 and the second wireless communication 12 may be referred to as a first connection and a second connection, respectively, or as a first subscription and a second subscription, respectively. In addition, although example embodiments will be described mainly with reference to the two SIMs, that is, the first and second SIMs 141 and 142, i.e., dual-SIM wireless communication as shown in FIG. 1, it will be understood that the example embodiments are also applicable to multi-SIM wireless communication using three or more SIMs, as shown in FIG. 1.

According to some embodiments, the UE 100 may support multi-standby (MS) and may support multi-receive (MR). For example, the UE 100 may switch between a multi-standby mode and a multi-receive mode and may be referred to as a multi-receive, multi-SIM multi-standby (MR-MSMS) device or a multi-radio, multi-SIM multi-standby (MR-MSMS) device. In addition, when the UE 100 includes two SIMs capable of performing simultaneous reception, it may be referred to as a dual-receive, dual-SIM dual-standby (DR-DSDS) device or a dual-radio, dual-SIM dual-standby (DR-DSDS) device.

In the multi-standby mode, two or more SIMs in the UE 100 may share an RF resource (e.g., an RF path) provided by the RFIC 120. Referring to FIG. 1, when an RF resource provided by the RFIC 120 in the UE 100 is shared by the first SIM 141 and the second SIM 142, each of the first wireless communication 11 and the second wireless communication 12 may exclusively use the RFIC 120, and accordingly, one of the first wireless communication 11 and the second wireless communication 12 may be suspended. For example, when the first wireless communication 11 is in an idle state, the first base station 211 may periodically transmit paging, and the paging is associated with a mobile termination (MT) call and may have high priority, and thus, to effectively receive and process the paging, the second wireless communication 12 may be suspended in the UE 100. Alternatively, in the multi-receive mode, the RFIC 120 may provide RF resources (e.g., RF paths) independent from each other, and two or more SIMs in the UE 100 may perform reception independently from each other. For example, the UE 100 may perform both reception through the first wireless communication 11 associated with the first SIM 141 and reception through the second wireless communication 12 associated with the second SIM 142.

The antenna array 110 may include at least one antenna and receive RF signals from the first base station 211 and the second base station 221 or transmit RF signals to the first base station 211 and the second base station 221. According to some embodiments, the antenna array 110 may include a plurality of antennas for multi-input multi-output (MIMO).

The RFIC 120 is hardware connected to the antenna array 110 and the MR-MS device 130 and may provide an RF resource (e.g., an RF path) for wireless communication. For example, the RFIC 120 may be referred to as a transceiver and may provide a reception signal RX as a baseband signal to the MR-MS device 130 by processing an RF signal received from the antenna array 110 and provide an RF signal to the antenna array 110 by processing a transmission signal TX as a baseband signal. The RFIC 120 may be controlled by the MR-MS device 130 and may include, as a non-limited example, switches, matching circuits, filters, amplifiers, mixers, and the like.

According to some embodiments, the RFIC 120 may support carrier aggregation (CA) using a plurality of carriers. For example, the UE 100 may transmit or receive data to or from the first base station 211 and/or the second base station 221 by simultaneously using two or more carriers, each carrier being referred to as a component carrier (CC). The RFIC 120 may form RF paths corresponding to CCs used for CA and process signals transmitted and received through the RF paths.

According to some embodiments, the RFIC 120 may support multi-receive, and accordingly form a plurality of RF paths independent from each other. Particularly, when the RFIC 120 forms two RF paths independent from each other, the RFIC 120 may be considered to support dual-receive (or dual-radio) (DR). As described above, the RFIC 120 may provide RF paths independent from each other as RF resources, and the MR-MS device 130 may acquire information on the capability of the RFIC 120, the information indicating available RF resources provided by the RFIC 120. Multi-receive may be referred to as multi-radio or multi-connectivity, and dual-receive may be referred to as dual-radio or dual-connectivity.

The MR-MS device 130 may communicate with the RFIC 120 by using the baseband signals TX and RX and may be coupled to the first to mth SIMS 141, 142, 143, and the like. For example, the first SIM 141 may include information for accessing the first network 210 via the first wireless communication 11, and the second SIM 142 may include information for accessing the second network 220 via the second wireless communication 12. As described below with reference to FIG. 2, the MR-MS device 130 may have an architecture for processing an access associated with the first SIM 141 and an access associated with the second SIM 142. According to some embodiments, the MR-MS device 130 may include a hardware block designed through logic synthesis, a software block including a series of instructions, a processing unit including at least one processor configured to execute a series of instructions, and a combination thereof. According to some embodiments, the MR-MS device 130 may be referred to as a modem or a baseband processor.

A signal transmitted from a base station may arrive at the UE 100 through multiple paths. For example, each of the first wireless communication 11 and the second wireless communication 12 may be performed through multiple paths. Multi-path signals may arrive at the UE 100, i.e., the antenna array 110, at different time points. To process these signals received through multiple paths, the MR-MS device 130 may include a rake receiver including a plurality of fingers. The finger may be referred to as a correlator or a sub-receiver, and one finger may process (e.g., demodulate) a signal received through one path among multiple paths. Signals provided from the plurality of fingers may be rake-combined, and accordingly, information included in the signals may be favorably acquired. An example of the rake receiver may be described below with reference to FIG. 3 and the like.

In the multi-receive mode, as described above, the RFIC 120 may provide RF resources independent from each other, and the MR-MS device 130 may also provide resources independent from each other to two or more SIMs. For example, the plurality of fingers of the rake receiver included in the MR-MS device 130 may be assigned to two or more SIMs. According to some embodiments, the plurality of fingers may be assigned to a single SIM in the multi-standby mode, whereas the plurality of fingers may be divided into two or more finger groups, e.g., k finger groups FG1, . . . , FGk, and the like (k is an integer greater than 1) as shown in FIG. 1, in the multi-receive mode. The number of finger groups may correspond to the number of two or more SIMs associated with reception in the multi-receive mode among the first to mth SIMs 141, 142, 143, and the like, and a SIM may be allocated only fingers belonging to a finger group corresponding to the SIM. Accordingly, in the multi-receive mode, fingers may be simply allocated to multiple paths, and the complexity of resources, e.g., hardware and/or software, for the finger allocation may be reduced. In addition, because the plurality of fingers used in the multi-standby mode are also used in the multi-receive mode, addition of fingers for the multi-receive mode may be omitted, thereby resulting in a decrease in costs, e.g., an area, power consumption, and the like, of the MR-MS device 130 and an increase in the efficiency of multi-receive.

Figure 2:
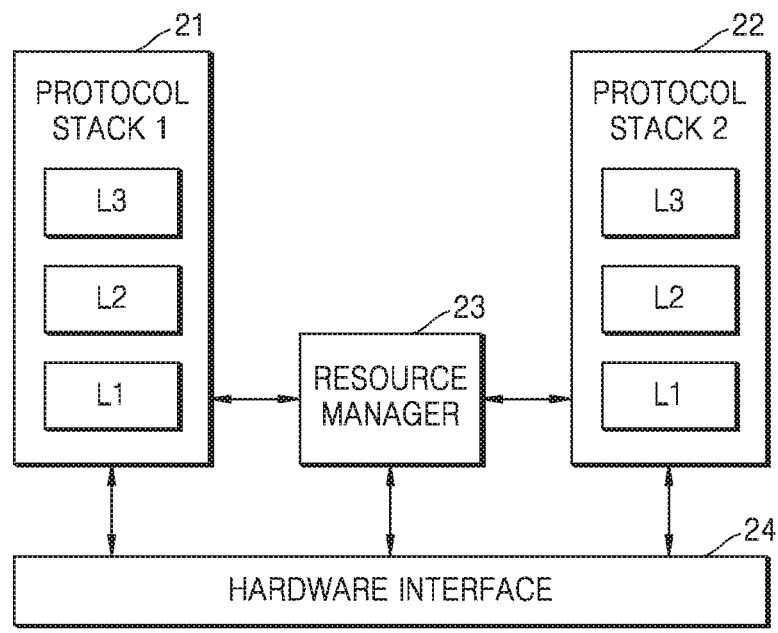
FIG. 2 is a block diagram of a protocol stack system according to an example embodiment.

FIG. 2 is a block diagram of a protocol stack system 20 according to an example embodiment. In detail, FIG. 2 illustrates a control plane of a first protocol stack 21 and a second protocol stack 22 included in the protocol stack system 20. According to some embodiments, the protocol stack system 20 of FIG. 2 may be implemented in the MR-MS device 130 of FIG. 1, and the MR-MS device 130 may perform operations for wireless communication by using the protocol stack system 20. At least some blocks shown in FIG. 2 may be implemented as a hardware logic according to some embodiments, and as a software module executed by at least one processor according to some embodiments. That is, each of the blocks of FIG. 2 may be implemented as hardware logic, as software module, or as a combination of hardware logic and software module. Hereinafter, FIG. 2 will be described with reference to FIG. 1.

Referring to FIG. 2, the protocol stack system 20 may include the first protocol stack 21 and the second protocol stack 22 respectively associated with the first SIM 141 and the second SIM 142. As described above with reference to FIG. 1, each of the first protocol stack 21 and the second protocol stack 22 may support random RAT. According to some embodiments, the first protocol stack 21 and the second protocol stack 22 may interact with a shared higher layer, i.e., an application layer, and the higher layer may provide an interface for programs of acquiring information regarding the first wireless communication 11 and the second wireless communication 12 or providing commands. The higher layer may be implemented in the MR-MS device 130 or in another device separated from the MR-MS device 130.

The protocol stack system 20 may include a hardware interface 24 shared by the first protocol stack 21 and the second protocol stack 22. The hardware interface 24 may provide an interface for hardware, e.g., the RFIC 120 of FIG. 1, and the first protocol stack 21 and the second protocol stack 22 may provide or acquire a signal to or from the RFIC 120 through the hardware interface 24. According to some embodiments, the hardware interface 24 may be referred to as a driver of the RFIC 120.

Each of the first protocol stack 21 and the second protocol stack 22 for the control plane may include a plurality of layers. As shown in FIG. 2, the first protocol stack 21 may include a first layer L1, a second layer L2, and a third layer L3, and the first layer L1, the second layer L2, and the third layer L3 may correspond to three lower layers in an Open System Interconnection (OSI) model. For example, in LTE, 5G NR, or the like, a physical (PHY) layer may belong to the first layer L1, a medium access control (MAC) layer, a radio link control (RLC) layer, and a packet data convergence protocol (PDCP) layer may belong to the second layer L2, and a radio resource control (RRC) layer and a non-access stratum (NAS) layer may belong to the third layer L3. Similarly to the first protocol stack 21, the second protocol stack 22 may also include the first layer L1, the second layer L2, and the third layer L3. In the present specification, an operation of the first protocol stack 21 may be referred to as an operation of the first SIM 141, and an operation of the second protocol stack 22 may be referred to as an operation of the second SIM 142.

A resource manager 23 may manage resources to be provided to the first wireless communication 11 by the first protocol stack 21, and to the second wireless communication 12 by the second protocol stack 22. According to some embodiments, the resource manager 23 may assign the plurality of fingers of the rake receiver to a single SIM in the multi-standby mode, and divide the plurality of fingers into two or more finger groups and assign the two or more finger groups to two or more SIMs, respectively, in the multi-receive mode. According to some embodiments, as described below with reference to FIG. 13, the resource manager 23 may be a software module executed by at least one processor and be stored in a memory, or be a hardware module designed by logic synthesis.

Figure 3:
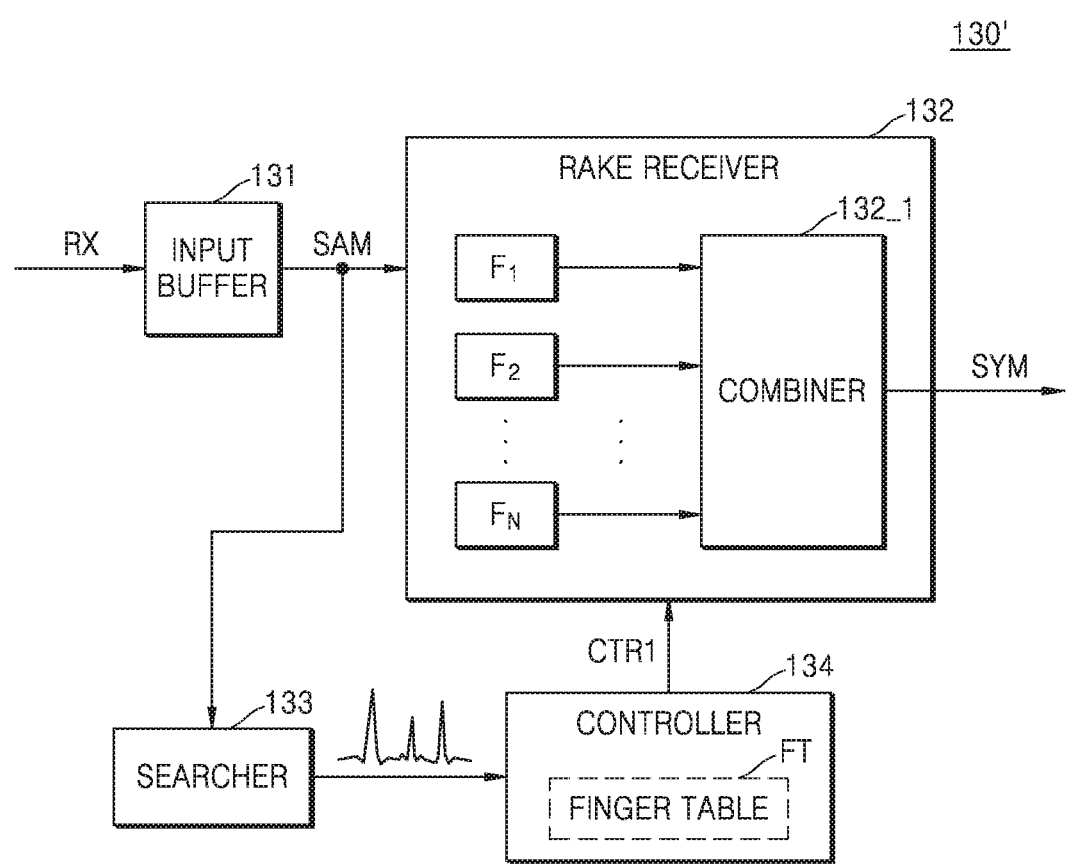
FIG. 3 is a block diagram of an example of a multi-receive multi-subscriber (MR-MS) identity module device of the wireless communication system of FIG. 1, according to an example embodiment.

FIG. 3 is a block diagram of an example of the MR-MS device 130 of the wireless communication system of FIG. 1, according to an example embodiment. As described above with reference to FIG. 1, an MR-MS device 130' of FIG. 3 may receive the reception signal RX as a baseband signal from the RFIC 120. As shown in FIG. 3, the MR-MS device 130' may include an input buffer 131, a rake receiver 132, a searcher 133, and a controller 134, and hereinafter, FIG. 3 will be described with reference to FIG. 1.

The input buffer 131 may receive the reception signal RX and output samples SAM of the reception signal RX. According to some embodiments, the reception signal RX may be an analog signal, and the input buffer 131 may output the samples SAM of the reception signal RX by performing analog-digital conversion. As shown in FIG. 3, the samples SAM of the reception signal RX may be provided to the rake receiver 132 and the searcher 133.

The rake receiver 132 may include a plurality of (first to Nth) fingers $F_1, F_2, \ldots,$ to $F_N$ (N is an integer greater than 1) and a combiner 132_1. One of the plurality of fingers $F_1$ to $F_N$ may be allocated to one of multiple paths according to a first control signal CTR1 provided from the controller 134, and the combiner 132_1 may generate a series of symbols SYM by rake-combining outputs of the fingers allocated to the paths. The combiner 132_1 may include a plurality of symbol combiners, and an example of the combiner 132_1 will be described below with reference to FIGS. 10A and 10B.

The searcher 133 may receive the samples SAM of the reception signal RX and detect multiple paths from the samples SAM. For example, the searcher 133 may include matched filters and may detect multiple paths by measuring impulse responses from outputs of the matched filters. As shown in FIG. 3, information on the detected multiple paths may be provided to the controller 134.

The controller 134 may receive the information on the multiple paths from the searcher 133. The controller 134 may generate, based on the information on the multiple paths, the first control signal CTR1 for allocating the plurality of fingers $F_1$ to $F_N$ to the multiple paths. For example, as shown in FIG. 3, the controller 134 may include a finger table FT containing states of the plurality of fingers $F_1$ to $F_N$ and generate the first control signal CTR1 with reference to the finger table FT. According to some embodiments, the controller 134 may allocate fingers to only paths having a certain threshold strength or more among the detected paths and allocate fingers which have not been allocated to paths, i.e., free fingers, to newly detected paths. An example of the finger table FT will be described below with reference to FIGS. 5A and 5B.

According to some embodiments, the controller 134 may assign the plurality of fingers $F_1$ to $F_N$ to a single SIM and allocate an arbitrary finger among the plurality of fingers $F_1$ to $F_N$ to detected paths for the single SIM in the multi-standby mode. In addition, according to some embodiments, the controller 134 may divide the plurality of fingers $F_1$ to $F_N$ into two or more finger groups corresponding to two or more SIMs associated with multi-receive and allocate fingers belonging to a finger group corresponding to a corresponding SIM to detected paths for the SIM. An example of an operation of the controller 134 will be described below with reference to FIG. 4.

Figure 4:
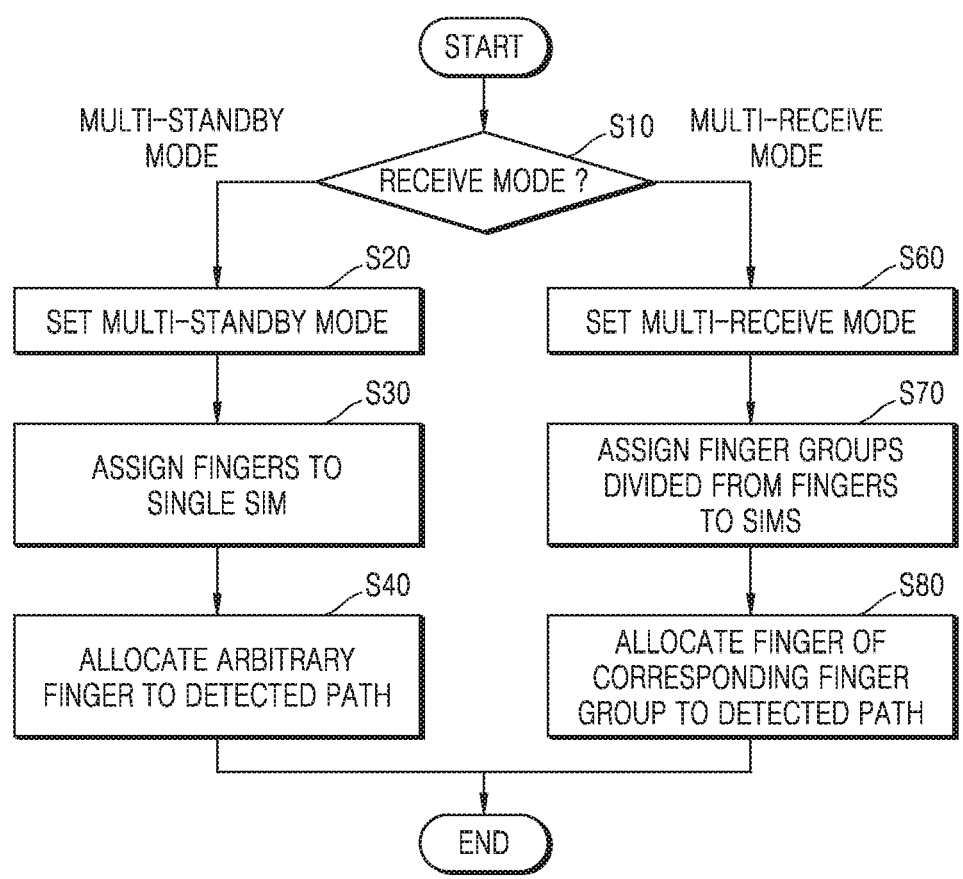
FIG. 4 is a flowchart of a method for MR-MS, according to an example embodiment.
Figure 5A:
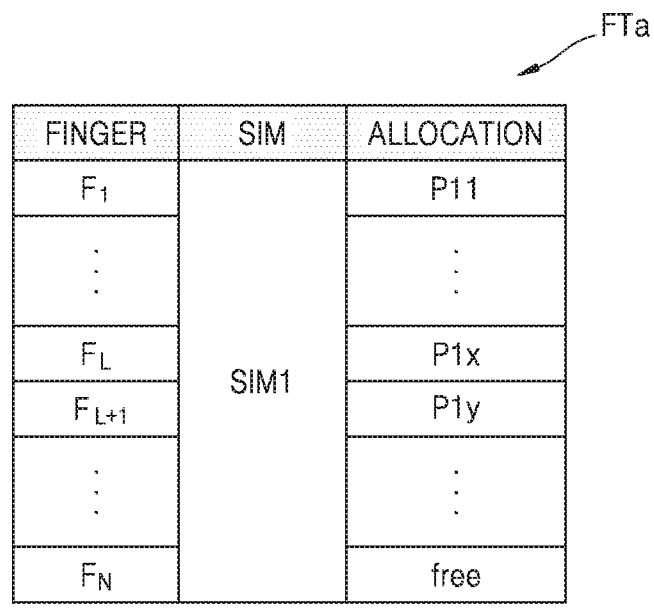
FIGS. 5A and 5B illustrate finger tables according to example embodiments.
Figure 5B:
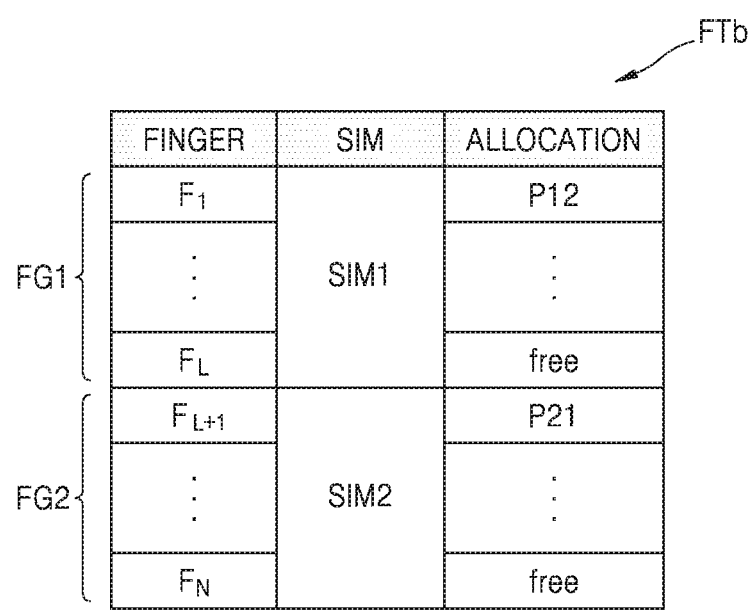

FIG. 4 is a flowchart of a method for MR-MS, according to an example embodiment, and FIGS. 5A and 5B illustrate finger tables FTa and FTb according to example embodiments. According to some embodiments, the method of FIG. 4 may be performed by the controller 134 of FIG. 3, and the finger tables FTa and FTb of FIGS. 5A and 5B may be examples of the finger table FT of FIG. 3. In detail, FIG. 5A illustrates the finger table FTa in the multi-standby mode, and FIG. 5B illustrates the finger table FTb in the multi-receive mode. Hereinafter, FIGS. 4, 5A, and 5B will be described below with reference to FIG. 3.

Referring to FIG. 4, in operation S10, an operation of determining a receive mode may be performed. For example, the controller 134 may determine whether the receive mode is the multi-standby mode or the multi-receive mode. The receive mode may be determined based on various pieces of information, and an example of operation S10 will be described below with reference to FIG. 6. As shown in FIG. 4, when the multi-standby mode is determined in operation S10, operation S20 may be subsequently performed. Otherwise, when the multi-receive mode is determined in operation S10, operation S60 may be subsequently performed.

In operation S20, an operation of setting the multi-standby mode may be performed. As described above with reference to FIG. 1, the multi-standby mode may be referred to as a mode in which two or more SIMs share an RF resource, and settings for the multi-standby mode may be performed in operation S20. For example, the controller 134 may configure the RFIC 120 of FIG. 1 such that the RFIC 120 provides an RF path for single wireless communication (e.g., the first or second wireless communication 11 or 12). An example of operation S20 will be described below with reference to FIG. 9.

In operation S30, an operation of assigning fingers to a single SIM may be performed. For example, the controller 134 may assign the plurality of fingers $F_1$ to $F_N$ to a single SIM associated with wireless communication. Accordingly, all of the plurality of fingers $F_1$ to $F_N$ may be used for the wireless communication associated with the single SIM. Referring to FIG. 5A, as shown in the finger table FTa, in the multi-standby mode, the plurality of fingers $F_1$ to $F_N$ may be assigned to a single SIM, e.g., the first SIM 141.

Next, in operation S40, an operation of allocating an arbitrary finger to a detected path may be performed. For example, the controller 134 may allocate, to a detected path, an arbitrary finger among the plurality of fingers $F_1$ to $F_N$ assigned to a single SIM. Referring to FIG. 5A, as shown in the finger table FTa, the first finger $F_1$ may be allocated to a path P11, and an Nth finger $F_N$ may be in a state in which the Nth finger $F_N$ is allocated no path, i.e., a free finger.

In operation S60, an operation of setting the multi-receive mode may be performed. As described above with reference to FIG. 1, the multi-receive mode may be referred to as a mode in which two or more SIMs perform reception through RF resources independent from each other, and settings for the multi-receive mode may be performed in operation S60. For example, the controller 134 may configure the RFIC 120 of FIG. 1 such that the RFIC 120 provides two or more RF paths for two or more wireless communications (e.g., the first and second wireless communications 11 and 12). An example of operation S60 will be described below with reference to FIG. 9.

In operation S70, an operation of assigning finger groups divided from fingers to SIMs may be performed. For example, the controller 134 may divide the plurality of fingers $F_1$ to $F_N$ into a plurality of finger groups, and assign two or more finger groups divided from the plurality of fingers $F_1$ to $F_N$ to two or more SIMs associated with two or more wireless communications. Accordingly, fingers belonging to a finger group may be used for wireless communication associated with a SIM corresponding to the finger group. Referring to FIG. 5B, as shown in the finger table FTb, in the multi-receive mode, fingers $F_1$ to $F_L$ belonging to a first finger group FG1 among the plurality of fingers $F_1$ to $F_N$ may be assigned to a first SIM SIM1, and fingers $F_{L+1}$ to $F_N$ belonging to a second finger group FG2 may be assigned to a second SIM SIM2 (L is an integer greater than 1). According to some embodiments, the controller 134 may form the finger table FTb of FIG. 5B by dividing the finger table FTa of FIG. 5A, or in the multi-receive mode two or more finger tables (two finger groups in the example of FIG. 5B) may be used. An example of operation S70 will be described below with reference to FIGS. 7 and 9.

Next, in operation S80, an operation of allocating a finger belonging to a corresponding finger group to a detected path may be performed. For example, the controller 134 may allocate an arbitrary finger among fingers belonging to a finger group divided in operation S70 to a detected path for a SIM corresponding to the finger group. Referring to FIG. 5B, as shown in the finger table FTb, the first finger F1 belonging to the first finger group FG1 may be allocated to a path P12 associated with the first SIM SIM1, and an (L+1)th finger $F_{L+1}$ belonging to the second finger group FG2 may be allocated a path P21 associated with the second SIM2.

Figure 6:
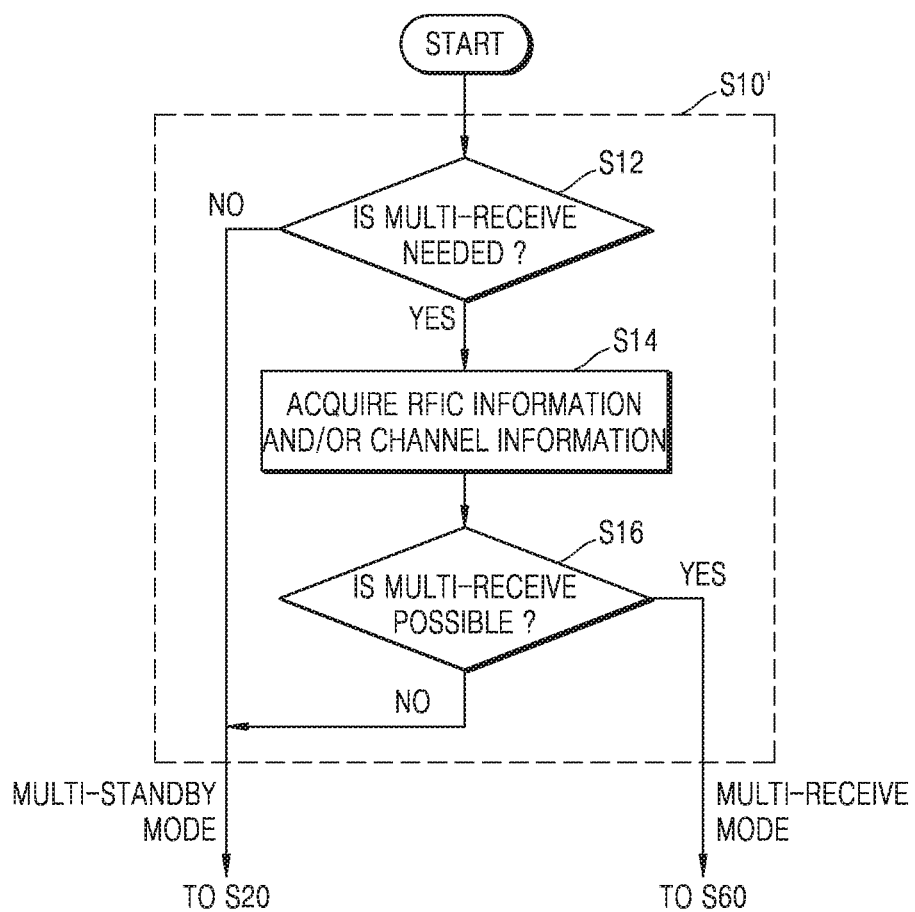
FIG. 6 is a flowchart of an example of operation S10 of FIG. 4, according to an example embodiment.

FIG. 6 is a flowchart of an example of operation S10 of FIG. 4, according to an example embodiment. As described above with reference to FIG. 4, an operation of determining a receive mode may be performed in operation S10' of FIG. 6, and as shown in FIG. 6, operation S10' may include a plurality of operations S12, S14, and S16. According to some embodiments, operation S10' of FIG. 6 may be performed by the controller 134 of FIG. 3, and FIG. 6 will be described with reference to FIGS. 3 and 4.

In operation S12, it may be determined whether multi-receive is needed, and as shown in FIG. 6, when it is determined that multi-receive is needed (operation S12, YES), operation S14 may be subsequently performed. Otherwise (operation S12, NO), the multi-standby mode may be determined, and operation S20 of FIG. 4 may be subsequently performed. When two or more SIMs simultaneously require an RF resource, the controller 134 may determine that the multi-receive mode is needed, but when only a single SIM requires an RF source, the controller 134 may determine that the multi-receive mode is not needed.

According to some embodiments, resources, e.g., fingers, symbol combiners, and the like, may be non-uniformly provided to two or more SIMs simultaneously requiring an RF resource. For example, the first SIM 141 of FIG. 1 may require an RF resource for channels for maintaining a connection state, and the second SIM 142 may require an RF resource for channels needed for an idle state. As a non-limited example, in a WCDMA system, a dedicated channel (DCH), a forward access channel (FACH), a random access channel (RACH), a broadcast channel (BCH), a paging channel (PCH), and the like may be needed to maintain the connection state, whereas the idle state may need the BCH and the PCH. As another example, in an LTE system, a downlink shared channel (DL-SCH), a multicast channel (MCH), the BCH, the PCH, and the like may be needed to maintain the connection state, whereas the idle state may need the MCH, the BCH, and the PCH. As such, a SIM corresponding to the idle state may require more limited channels than a SIM corresponding to the connection state, and accordingly, as described below with reference to FIG. 7, in the multi-receive mode, a SIM corresponding to the connection state may be determined as a main SIM, and a SIM corresponding to the idle state may be determined as a sub-SIM.

According to some embodiments, the controller 134 may determine whether multi-receive is needed by predicting a duration in which two or more SIMS simultaneously require an RF resource. For example, when the first wireless communication 11 of FIG. 1 is in the connection state, and the second wireless communication 12 of FIG. 1 is in the idle state, the second SIM 142 may periodically attempt reception of a signal. The controller 134 may recognize a time point at which the second SIM 142 requires an RF resource, based on a period in which the second SIM 142 receives a signal, and when the first SIM 141 aperiodically requires an RF resource, the controller 134 may predict a period in which the first SIM 141 and the second SIM 142 simultaneously require an RF resource. In this case, as described below with reference to FIG. 7, the first SIM 141 may be determined as a main SIM, and the second SIM 142 may be determined as a sub-SIM.

As another example, when both the first wireless communication 11 and the second wireless communication 12 of FIG. 1 are in the idle state, the first SIM 141 and the second SIM 142 may require an RF resource according to periods of the first SIM 141 and the second SIM 142, respectively. The controller 134 may predict a period in which the first SIM 141 and the second SIM 142 simultaneously require an RF resource, based on the periods respectively corresponding to the first SIM 141 and the second SIM 142. In this case, as described below with reference to FIG. 7, a SIM which first requires an RF resource before a period in which the first SIM 141 and the second SIM 142 simultaneously require an RF resource, i.e., a SIM which is woken up at an earlier time point that the other SIM, between the first SIM 141 and the second SIM 142 may be determined as a main SIM, and the other SIM may be determined as a sub-SIM.

Returning to FIG. 6, in operation S14, an operation of acquiring RFIC information and/or channel information may be performed. For example, the controller 134 may be acquire RFIC information indicating the capability of the RFIC 120 of FIG. 1 to recognize whether it is possible for the RFIC 120 to provide RF resources, i.e., multiple paths, for multi-receive. The controller 134 may receive RFIC information from the RFIC 120 according to some embodiments, and may acquire RFIC information stored in a memory (e.g., 134_2 of FIG. 13) included in an MR-MS device 130' according to some embodiments. In addition, the controller 134 may acquire channel information indicating channels required for two or more SIMs associated with multi-receive, i.e., simultaneously requiring an RF resource.

In operation S16, an operation of determining whether multi-receive is possible may be performed. That is, whether multi-receive is possible may be determined based on RFIC information and/or the channel information acquired in operation S14. For example, when it is determined, based on the RFIC information that the RFIC 120 of FIG. 1 cannot provide RF paths independent from each other, the controller 134 may determine the multi-standby mode, and operation S20 of FIG. 4 may be subsequently performed. As another example, when it is determined based on the RFIC information that the RFIC 120 of FIG. 1 can provide RF paths independent from each other, the controller 134 may determine, based on the channel information, whether channels required for two or more SIMs are a set of channels processable by the MR-MS device 130'.

According to some embodiments, when at least two SIMs among two or more SIMs associated with multi-receive are in the connection state, the controller 134 may determine that multi-receive is impossible and determine the multi-standby mode. For example, in a WCDMA system, when at least two SIMs among two or more SIMs associated with multi-receive require a channel other than a PCH and a BCH, the controller 134 may determine that multi-receive is impossible and determine the multi-standby mode. In addition, according to some embodiments, when maximum one SIM among two or more SIMs associated with multi-receive is in the connection state, and the other SIM(s) are in the idle state (including a case where all of the two or more SIMs associated with multi-receive are in the idle state), the controller 134 may determine the multi-receive mode. For example, in a WCDMA system, when maximum one SIM among two or more SIMs associated with multi-receive requires a channel other than the PCH and the BCH, the controller 134 may determine the multi-receive mode.

According to some embodiments, when one of the first SIM 141 and the second SIM 142 of FIG. 1 requires a channel needed in the idle state, e.g., a PCH or both a PCH and a BCH, the controller 134 may determine that multi-receive is possible. For example, when two SIMs SIM1 and SIM2 simultaneously require channels as shown in Table 1 below, the controller 134 may determine that multi-receive (i.e., dual-receive) is possible. When it is determined that multi-receive is possible, as shown in FIG. 6, the multi-receive mode may be determined, and operation S60 of FIG. 4 may be subsequently performed.

TABLE 1

| SIM1 | SIM2 |
|---|---|
| DCH | PCH |
| DCH | PCH + BCH |
| PCH | PCH |
| PCH + BCH | PCH |
| PCH | PCH + BCH |
| PCH + BCH | PCH + BCH |

According to some embodiments, the operation of determining a receive mode in operation S10' may be triggered in the multi-receive mode. For example, according to a combination of channels as shown in Table 1, when the second SIM SIM2 newly requires a DCH (e.g., for aperiodic reception) in a state of entering the multi-receive mode, the controller 134 may perform an operation of determining a receive mode and determine, according to a channel required for the first SIM SIM1, whether multi-receive is possible. For example, in a case where the DCH is required for the first SIM SIM1, the controller 134 may determine that the multi-receive mode is impossible, according to Table 1.

Figure 7:
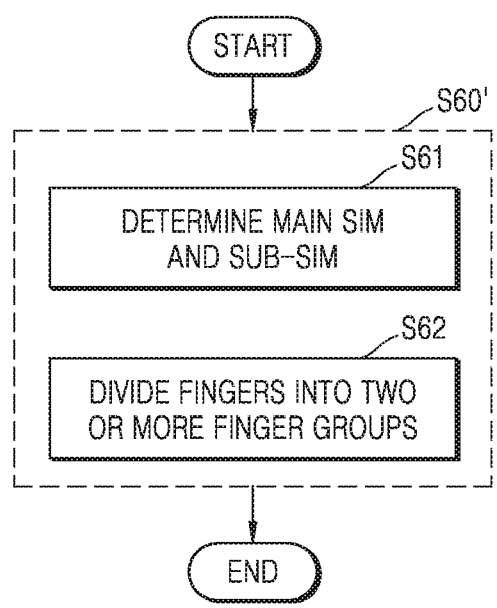
FIG. 7 is a flowchart of an example of operation S60 of FIG. 4, according to an example embodiment.

FIG. 7 is a flowchart of an example of operation S60 of FIG. 4, according to an example embodiment. As described above with reference to FIG. 4, an operation of setting the multi-receive mode may be performed in operation S60' of FIG. 7. As shown in FIG. 7, operation S60' may include operations S61 and S62. According to some embodiments, unlike shown in FIG. 7, operation S60' may include only one of operations S61 and S62. According to some embodiments, operations in FIG. 7 may be performed by the controller 134 of FIG. 3, and hereinafter, FIG. 7 will be described with reference to FIGS. 3 and 4.

In operation S61, an operation of determining a main SIM and a sub-SIM may be performed. For example, the controller 134 may determine one of two or more SIMs associated with multi-receive as the main SIM and determine the other SIM(s) as sub-SIM(s). The main SIM may be determined as a SIM requiring more resources, e.g., RF resources, fingers, and symbol combiners, than the other SIM(s), i.e., the sub-SIM(s), or as a SIM requiring a resource at an earlier time point than the other SIM(s). According to some embodiments, the controller 134 may determine, as the main SIM, a SIM (e.g., a SIM corresponding to the connection state) requiring a channel other than channels, e.g., a PCH and a BCH, needed in the idle state. For example, in Table 1, the first SIM SIM1 may be determined as the main SIM, and the second SIM SIM2 may be determined as a sub-SIM.

According to some embodiments, the controller 134 may determine, as the main SIM, a SIM of which a wakeup time is earliest among two or more SIMs. For example, as described above with reference to FIG. 6, the controller 134 may predict a period in which the two or more SIMs simultaneously require an RF resource, determine, as the main SIM, a SIM first requiring an RF resource before the predicted period, i.e., a SIM woken up at the earliest time point, and determine the other SIM(s) as sub-SIM(s). As described below with reference to FIGS. 10A and 10B, the controller 134 may differently assign resources, e.g., RF resources, fingers, and symbol combiners, to the main SIM and the sub-SIM(s).

In operation S62, an operation of dividing fingers into two or more finger groups may be performed. For example, the controller 134 may divide the plurality of fingers $F_1$ to $F_N$ into finger groups corresponding to the number of SIMs associated with multi-receive. According to some embodiments, the two or more finger groups may be defined in advance, e.g., in manufacturing the MR-MS device 130'. For example, in the finger table FTb of FIG. 5B, it may be defined in advance that the L fingers $F_1$ to $F_L$ belong to the first finger group FG1, and it may be defined in advance that the (N-L) fingers $F_{L+1}$ to $F_N$ belong to the second finger group FG2. According to some embodiments, the two or more finger groups may be dynamically defined when entering the multi-receive mode. For example, as shown in the finger table FTb of FIG. 5B, when the plurality of fingers $F_1$ to $F_N$ are divided into the two finger groups FG1 and FG2, L may be determined when entering the multi-receive mode.

According to some embodiments, a size of a finger group divided from fingers, i.e., the number of fingers belonging to the finger group, may be based on the number of radio links. For example, because the numbers of channels and radio links required for a sub-SIM may be limited, the controller 134 may assign an appropriate number of fingers to the sub-SIM, and the remaining fingers may be assigned to the main SIM.

According to some embodiments, a size of a finger group divided from fingers may be based on space diversity (or antenna diversity). For example, the antenna array 110 may include a primary antenna and a secondary antenna, and when a strength of a signal arriving at the antenna array 110 is weak, space diversity may be used. According to space diversity, when an additional antenna, i.e., the secondary antenna, is used, to allocate fingers to multiple paths detected from a signal received through the secondary antenna, the controller 134 may assign a finger group of a large size, e.g., a double size, to a SIM associated with the signal received through space diversity.

Figure 8:
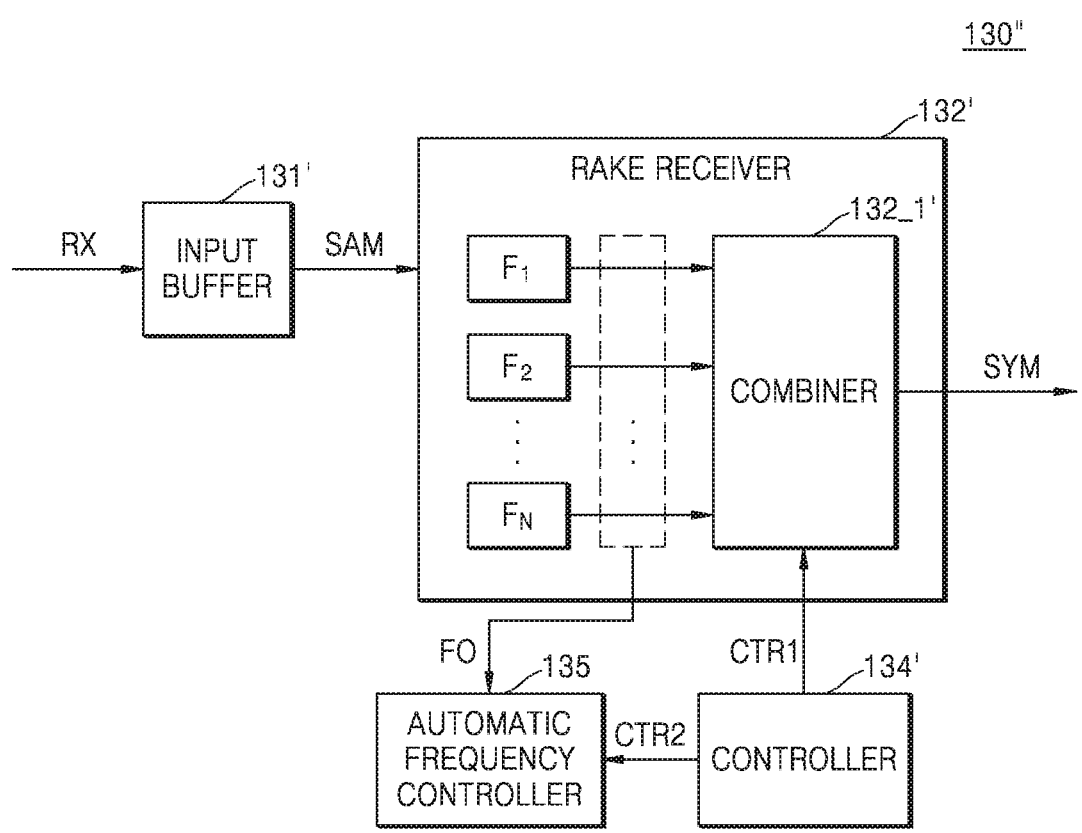
FIG. 8 is a block diagram of an example of the MR-MS device of the wireless communication system of FIG. 1, according to an example embodiment.

FIG. 8 is a block diagram of an example of the MR-MS device 130 of FIG. 1, according to an example embodiment. Similarly to the MR-MS device 130' of FIG. 3, an MR-MS device 130" of FIG. 8 may include an input buffer 131', a rake receiver 132', a searcher (not shown), and a controller 134' and may further include an automatic frequency controller 135. Hereinafter, the descriptions previously given with reference to FIG. 3 are omitted from the description with reference to FIG. 8.

The automatic frequency controller 135 may receive a finger output signal FO from at least one of the plurality of fingers $F_1$ to $F_N$ and compensate for a frequency offset based on the finger output signal FO. The frequency offset may indicate an error between a frequency used for wireless communication (e.g., the first or second wireless communication 11 or 12 of FIG. 1) and a frequency used inside the UE (e.g., 100 of FIG. 1). The automatic frequency controller 135 may estimate and compensate for a frequency offset based on the finger output signal FO output from a running finger, i.e., a finger allocated to a path, among the plurality of fingers $F_1$ to $F_N$. For two or more wireless communications independent from each other in the multi-receive mode, the automatic frequency controller 135 may include two or more automatic frequency control circuits.

The controller 134' may enable or disable some components of the MR-MS device 130" according to a receive mode. For example, as shown in FIG. 8, the controller 134' may provide the first control signal CTR1 to a combiner 132_1' and enable or disable at least one symbol combiner included in the combiner 132_1' according to a receive mode. In addition, the controller 134' may provide a second control signal CTR2 to the automatic frequency controller 135 and enable or disable at least one automatic frequency control circuit included in the automatic frequency controller 135. An example of an operation of the controller 134' will be described below with reference to FIGS. 10A and 10B. According to some embodiments, enabling a component may include an operation of supplying power to the component, and disabling a component may include an operation of cutting off supply of power.

Figure 10A:
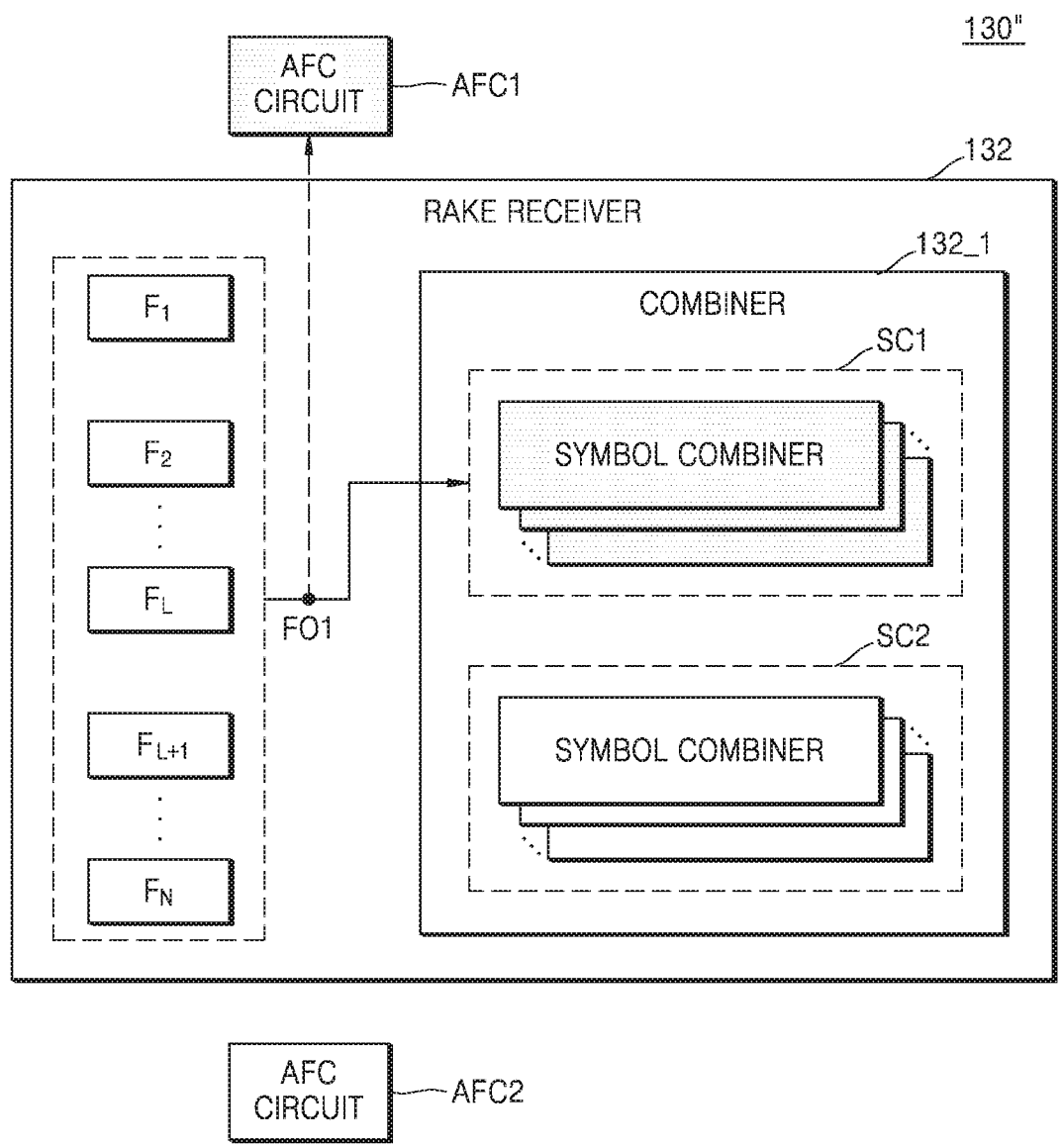
FIGS. 10A and 10B are block diagrams for describing examples of an operation of the MR-MS device of FIG. 8, according to example embodiments.
Figure 10B:
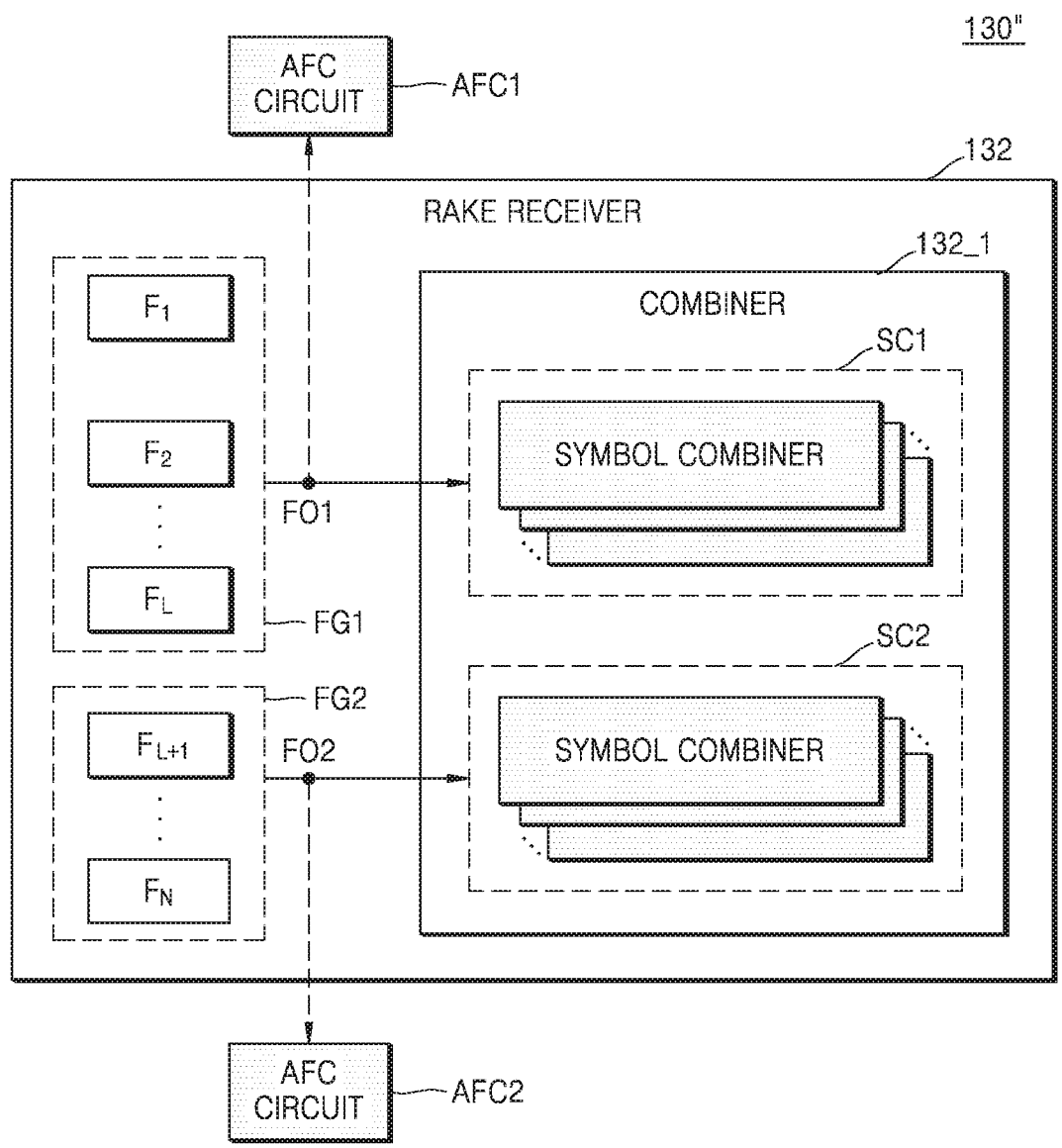

FIG. 9 is a flowchart of examples of operations S20 and S60 of FIG. 4, according to an example embodiment, and FIGS. 10A and 10B are block diagrams for describing examples of an operation of the MR-MS device 130" of FIG. 8, according to example embodiments. In detail, FIG. 9 illustrates a method of enabling or disabling some components of an MR-MS device (e.g., 130" of FIG. 8) according to a receive mode, and FIGS. 10A and 10B illustrate the MR-MS device 130" in the multi-standby mode and the multi-receive mode, respectively. According to some embodiments, operations S10", S20', and S60" of FIG. 9 may be performed by the controller 134' of FIG. 8. Hereinafter, the descriptions previously given above are omitted from the description with reference to FIGS. 10A and 10B.

Referring to FIG. 9, as described above with reference to FIG. 4, when the multi-standby mode is determined as a receive mode in operation S10", an operation of setting the multi-standby mode may be performed in operation S20' of FIG. 9, and when the multi-receive mode is determined as the receive mode in operation S10", an operation of setting the multi-receive mode may be performed in operation S60" of FIG. 9. As shown in FIG. 9, operation S20' may include operations S23 and S24. According to some embodiments, operation S20' may include only one of the operations S23 and S24. In addition, as shown in FIG. 9, operation S60" may include operations S63 and S64. According to some embodiments, operation S60" may include only one of the operations S63 and S64.

Referring to FIGS. 10A and 10B, the MR-MS device 130" may include the rake receiver 132. The rake receiver 132 may include the plurality of fingers $F_1$ to $F_N$ and the combiner 132_1, and the combiner 132_1 may include a plurality of symbol combiners. The plurality of symbol combiners included in the combiner 132_1 may be divided into a first combiner group SC1 and a second combiner group SC2. According to some embodiments, when the rake receiver 132 supports multi-receive by three or more SIMs, the plurality of symbol combiners may be divided into three or more combiner groups.

One symbol combiner may correspond to one channel, and accordingly, for the multi-receive mode, the combiner 132_1 may include more symbol combiners than channels for one SIM. For example, the first combiner group SC1 may include symbol combiners matched with a maximum number of channels for one SIM, and accordingly, the first combiner group SC1 may be used in reception for a main SIM. However, the second combiner group SC2 may include symbol combiners matched with a maximum number of channels (e.g., a PCH and a BCH) for a sub-SIM, e.g., may include two symbol combiners. In this case, the first combiner group SC1 may be used in both the multi-standby mode and the multi-receive mode, but the second combiner group SC2 may be used as additional symbol combiners only in the multi-receive mode.

The MR-MS device 130" may include a first automatic frequency control circuit AFC1 and a second automatic frequency control circuit AFC2 as the automatic frequency controller 135 of FIG. 8. According to some embodiments, the MR-MS device 130" may include three or more automatic frequency control circuits to support multi-receive by three or more SIMs. The first automatic frequency control circuit AFC1 may perform frequency compensation based on a first finger output signal FO1 provided to the first combiner group SC1, and the second automatic frequency control circuit AFC2 may perform frequency compensation based on a second finger output signal FO2 provided to the second combiner group SC2.

Referring back to FIG. 9, in operation S23, an operation of disabling at least one symbol combiner may be performed. For example, as shown in FIG. 10A, in the multi-standby mode, all of the plurality of fingers $F_1$ to $F_N$ may be used, but the symbol combiners belonging to the second combiner group SC2 among the symbol combiners of the combiner 132_1 may not be used. Accordingly, the controller 134' may disable the symbol combiners belonging to the second combiner group SC2, e.g., cut off power to be supplied to the symbol combiners belonging to the second combiner group SC2.

In operation S24, an operation of at least one automatic frequency control circuit may be performed. For example, as shown in FIG. 10A, in the multi-standby mode, the first automatic frequency control circuit AFC1 may compensate for a frequency offset based on the first finger output signal FO1 output from at least one finger allocated to a detected path among the plurality of fingers $F_1$ to $F_N$, and the second automatic frequency control circuit AFC2 may not be used. Accordingly, the controller 134' may disable the second automatic frequency control circuit AFC2, e.g., cut off power to be supplied to the second automatic frequency control circuit AFC2.

In operation S63, an operation of enabling a disabled symbol combiner may be performed. For example, as shown in FIG. 10B, in the multi-receive mode, the plurality of fingers $F_1$ to $F_N$ may be divided into the first finger group FG1 and the second finger group FG2. The first finger output signal FO1 output from at least one finger of the first finger group FG1 may be provided to the symbol combiners of the first combiner group SC1, and the second finger output signal FO2 output from at least one finger of the second finger group FG2 may be provided to the symbol combiners of the second combiner group SC2. Accordingly, unlike the example of FIG. 10A, the controller 134' may enable the second combiner group SC2, e.g., supply power to the symbol combiners belonging to the second combiner group SC2.

In operation S64, an operation of enabling a disabled automatic frequency control circuit may be performed. For example, as shown in FIG. 10B, in the multi-receive mode, compensation of a frequency offset may be required based on the second finger output signal FO2 provided from the second finger group FG2. Accordingly, unlike the example of FIG. 10A, the controller 134' may enable the second automatic frequency control circuit AFC2, e.g., supply power to the second automatic frequency control circuit AFC2.

Figure 11:
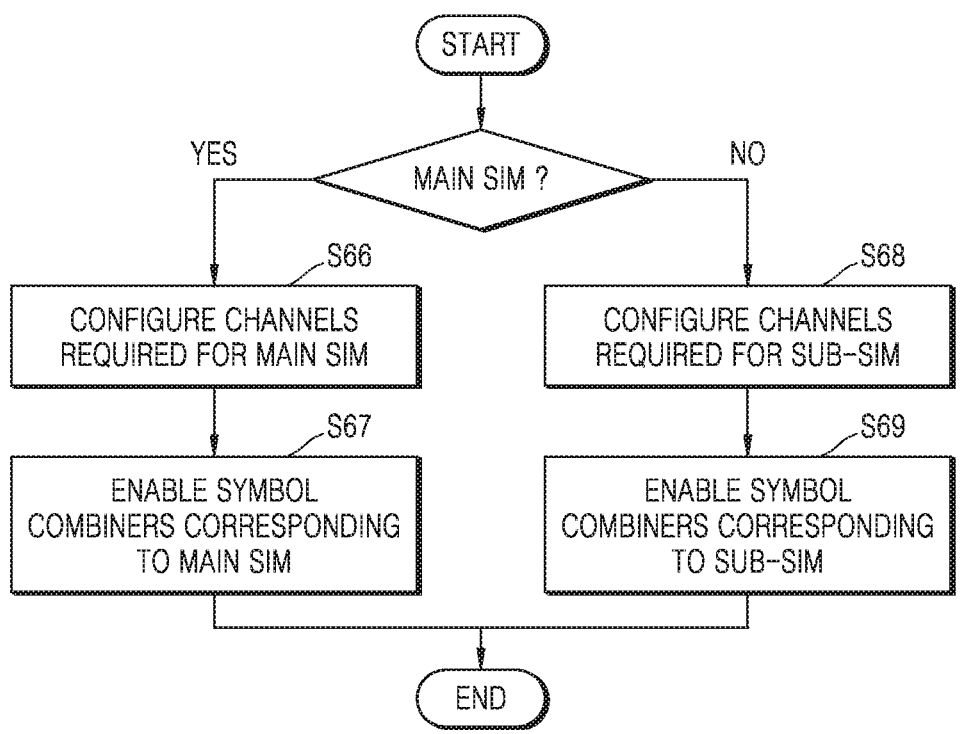
FIG. 11 is a flowchart of a method for MR-MS, according to an example embodiment.

FIG. 11 is a flowchart of a method for MR-MS, according to an example embodiment. In detail, FIG. 11 illustrates an operation of setting the multi-receive mode after determining the multi-receive mode, and according to some embodiments, FIG. 11 may be an example of operation S60 of FIG. 4. As shown in FIG. 11, operations S66 and S67 may be performed for a main SIM, and operations S68 and S69 may be performed for a sub-SIM. Hereinafter, FIG. 11 will be described with reference to FIGS. 8, 10A, and 10B.

In operation S66, an operation of configuring channels for the main SIM may be performed. For example, the controller 134' of FIG. 8 may map the symbol combiners belonging to the first combiner group SC1 to channels (e.g., a PCH, a BCH, and a DCH) for the main SIM. Next, in operation S67, an operation of enabling symbol combiners corresponding to the main SIM may be performed. For example, the controller 134' of FIG. 8 may enable the symbol combiners belonging to the first combiner group SC1 by supplying power to the symbol combiners belonging to the first combiner group SC1. Meanwhile, even in the multi-standby mode, similarly to operations S66 and S67, channels used by a single SIM may be mapped to the symbol combiners belonging to the first combiner group SC1, and the symbol combiners belonging to the first combiner group SC1 may be enabled as symbol combiners corresponding to the single SIM.

In operation S68, an operation of configuring channels for the sub-SIM may be performed. For example, the controller 134' of FIG. 8 may map the symbol combiners belonging to the second combiner group SC2 to channels (e.g., a PCH and a BCH) for the sub-SIM. Next, in operation S69, an operation of enabling symbol combiners corresponding to the sub-SIM may be performed. For example, the controller 134' of FIG. 8 may enable the symbol combiners belonging to the second combiner group SC2 by supplying power to the symbol combiners belonging to the second combiner group SC2.

Figure 12:
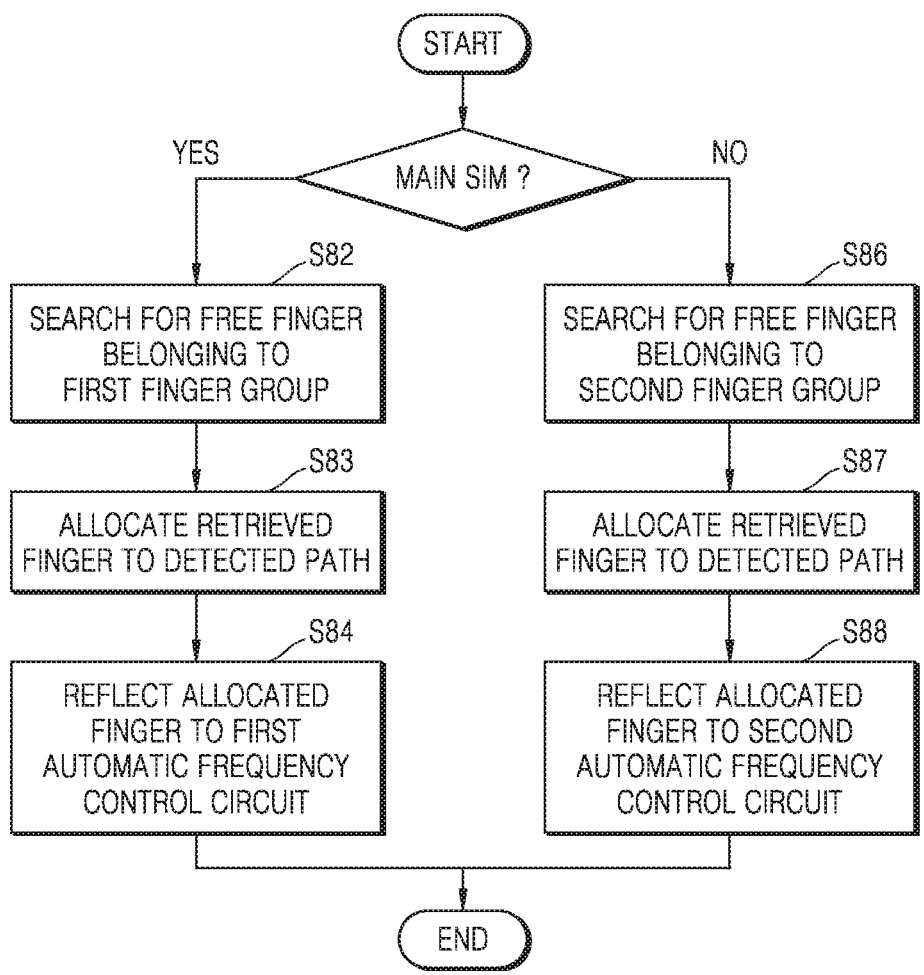
FIG. 12 is a flowchart of a method for MR-MS, according to an example embodiment.

FIG. 12 is a flowchart of a method for MR-MS, according to an example embodiment. In detail, FIG. 12 illustrates an operation of allocating a finger to a detected path in the multi-receive mode, and according to some embodiments, FIG. 12 may be an example of operation S80 of FIG. 4. As shown in FIG. 12, operations S82, S83, and S84 may be performed for a main SIM, and operations S86, S87, and S88 may be performed for a sub-SIM. Hereinafter, FIG. 12 will be described with reference to FIGS. 8, 10A, and 10B.

For the main SIM, in operation S82, an operation of searching for a free finger belonging to the first finger group FG1 may be performed. For example, the controller 134' may search for a free finger belonging to the first finger group FG1 assigned to the main SIM, for a path detected by a searcher (e.g., 133 of FIG. 3). The path detected by the searcher may vary over time, and accordingly, allocation and release of a finger may frequently occur. Because a finger for the main SIM is limited to a finger belonging to the first finger group FG1, the allocation and release of a finger for the main SIM may not be affected by allocation and release of a finger for another SIM, i.e., a sub-SIM, and accordingly, the allocation and release of a finger for the main SIM may be simply performed. Similarly, the allocation and release of a finger for the sub-SIM may also be simply performed, and as a result, hardware and/or software complexity of the controller 134' may be reduced. As another example, unlike operation S82, in the multi-standby mode, for a single SIM, an arbitrary finger among all fingers belonging to a finger table may be searched for.

In operation S83, an operation of allocating a retrieved finger to a detected path may be performed. Accordingly, the finger belonging to the first finger group FG1 may process a signal received through the detected path of wireless communication associated with the main SIM and provide the processed signal to a combiner, i.e., the symbol combiners belonging to the first combiner group SC1.

In operation S84, an operation of reflecting the allocated finger to the first automatic frequency control circuit AFC1 may be performed. For example, the controller 134' may control a finger output signal of the finger allocated in operation S83 among the fingers belonging to the first finger group FG1 to be provided to the first automatic frequency control circuit AFC1 such that the first automatic frequency control circuit AFC1 performs frequency compensation for the wireless communication associated with the main SIM.

For the sub-SIM, in operation S86, an operation of searching for a free finger belonging to the second finger group FG2 may be performed. For example, the controller 134' may search for a free finger belonging to the second finger group FG2 assigned to the sub-SIM, for a path detected by a searcher (e.g., 133 of FIG. 3).

In operation S87, an operation of allocating a retrieved finger to a detected path may be performed. Accordingly, the finger belonging to the second finger group FG2 may process a signal received through the detected path of wireless communication associated with the sub-SIM and provide the processed signal to a combiner, i.e., the symbol combiners belonging to the second combiner group SC2.

In operation S88, an operation of reflecting the allocated finger to the second automatic frequency control circuit AFC2 may be performed. For example, the controller 134' may control a finger output signal of the finger allocated in operation S87 among the fingers belonging to the second finger group FG2 to be provided to the second automatic frequency control circuit AFC2 such that the second automatic frequency control circuit AFC2 performs frequency compensation for the wireless communication associated with the sub-SIM.

Figure 13:
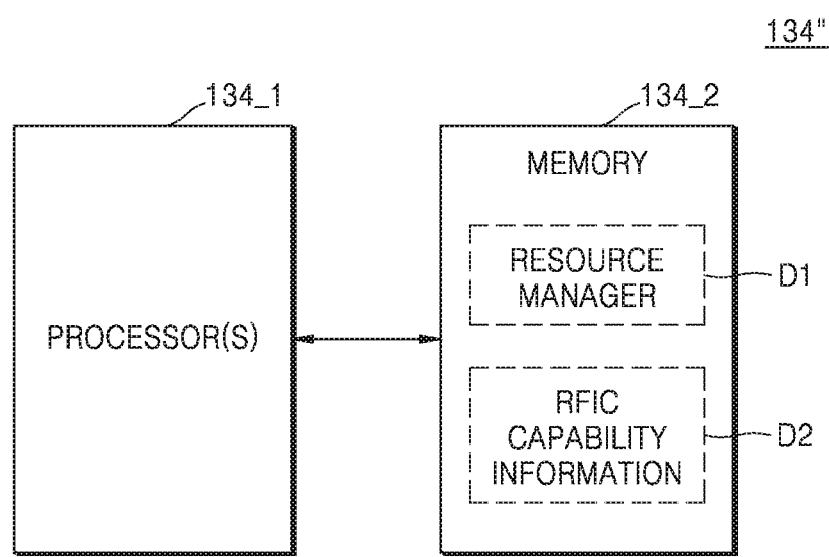
FIG. 13 is a block diagram of an example of a controller of the wireless communication system of FIG. 1, according to an example embodiment.

FIG. 13 is a block diagram of an example of the controller 134 of FIG. 1, according to an example embodiment. As shown in FIG. 13, a controller 134" may include at least one processor 134_1 and a memory 134_2, and the at least one processor 134_1 and the memory 134_2 may be connected to each other so as to enable communication therebetween.

The at least one processor 134_1 may perform an operation by executing program codes including instructions. The at least one processor 134_1 may be referred to as a hardware-implemented data processing device including a circuit physically structured to execute a desired operation, e.g., including operations represented by codes and/or instructions included in a program. According to some embodiments, this hardware-implemented data processing device may include, as a non-limited example, a microprocessor, a central processing unit (CPU), a processor core, a multi-core processor, a multi-processor, an application processor (AP), a communication processor (CP), an application specific integrated circuit (ASIC), and a field programmable gate array (FPGA).

The memory 134_2 may be accessed by the at least one processor 134_1, and as shown in FIG. 13, may store a resource manager D1 and an RFIC capability information D2. The memory 134_2 may include, as a non-limited example, random access memory (RAM), read only memory (ROM), a volatile memory, a nonvolatile memory, and any type of memory accessible by the at least one processor 134_1, such as a combination thereof. According to some embodiments, the memory 134_2 may be located outside the controller 134" or outside the MR-MS device 130 of FIG. 1. According to some embodiments, the resource manager D1 and the RFIC capability information D2 may be stored in separated memory devices, respectively.

The at least one processor 134_1 may perform at least some of the operations described above with reference to the accompanying drawings by executing the resource manager D1 stored in the memory 134_2. For example, the at least one processor 134_1 may execute the resource manager D1 to assign a plurality of fingers of a rake receiver to a single SIM in the multi-standby mode and to respectively assign two or more finger groups divided from a plurality of fingers to two or more SIMs in the multi-receive mode. In addition, the at least one processor 134_1 may execute the resource manager D1 to refer to the RFIC capability information D2 stored in the memory 134_2 and to determine, based on the RFIC capability information D2, whether entering the multi-receive mode from the multi-standby mode.

As described above, example embodiments are disclosed with reference to the drawings and the description. Although particular terms are used to describe the embodiments in the specification, these terms are used to describe the technical idea of the inventive concept but are not used to limit the meaning or limit the scope of the inventive concept in the claims. While the inventive concept has been particularly shown and described with reference to embodiments thereof, it will be understood that various changes in form and details may be made therein without departing from the spirit and scope of the following claims.

What is claimed is:

1. A device for a multi-receive multi-subscriber identity module (SIM), the device comprising: an input buffer configured to provide samples of a baseband signal;
    a rake receiver comprising a plurality of fingers and configured to generate a series of symbols from the samples; and
    a controller configured to assign the plurality of fingers to a single SIM of two or more SIMs in a multi-standby mode, and to respectively assign two or more finger groups divided from the plurality of fingers to the two or more SIMs in a multi-receive mode,
    wherein the controller, in the multi-receive mode, is further configured to divide the plurality of fingers into the two or more finger groups based on space diversity through which signals associated with the two or more SIMs are received,
    wherein the rake receiver comprises a plurality of symbol combiners each of which is configured to generate the series of symbols by rake combining signals provided from at least one of the plurality of fingers, and
    a first number of the plurality of symbol combiners is greater than a second number of channels required for one SIM.

2. The device of claim 1, further comprising a searcher configured to detect multiple paths based on the samples,
    wherein the controller is further configured to allocate, in the multi-standby mode, an arbitrary finger among the plurality of fingers to a first path that is detected, and to allocate, in the multi-receive mode, a finger belonging to a finger group to a second path that is detected, the finger group being assigned to a SIM of the two or more SIMs associated with the second path.

3. The device of claim 1, wherein the controller is further configured to divide the plurality of fingers into the two or more finger groups when entering the multi-receive mode from the multi-standby mode.

4. The device of claim 3, wherein the controller is further configured to divide the plurality of fingers into the two or more finger groups based on a number of radio links required for each of the two or more SIMs.

5. The device of claim 1, wherein the controller is further configured to determine entry to the multi-receive mode based on at least one of channels required for the two or more SIMs, or a capability of a radio frequency integrated circuit (RFIC) that provides the baseband signal.

6. The device of claim 1, wherein the controller is further configured to determine entry to the multi-standby mode when at least two SIMs among the two or more SIMs correspond to a connection state.

7. The device of claim 1, wherein the controller is further configured to determine entry to the multi-receive mode when at most one SIM among the two or more SIMs corresponds to a connection state, and the remaining SIM(s) correspond to an idle state.

8. The device of claim 1, wherein the controller is further configured to disable a first portion of the plurality of symbol combiners in the multi-standby mode and to enable a second portion of the plurality of symbol combiners in the multi-receive mode.

9. The device of claim 1, further comprising two or more automatic frequency control circuits each of which is configured to compensate for two or more frequency offsets corresponding to the two or more SIMs in the multi-receive mode.

10. The device of claim 9, wherein the controller is further configured to disable a first portion of the two or more automatic frequency control circuits in the multi-standby mode and to enable a second portion of the two or more automatic frequency control circuits in the multi-receive mode.

11. The device of claim 1, wherein the controller is further configured to determine one of the two or more SIMs as a main SIM and determine the remaining ones of the two or more SIMs as a sub-SIM, based on at least one of channels required for the two or more SIMs or wakeup times of the two or more SIMs, in the multi-receive mode.

12. The device of claim 1, wherein the two or more SIMs include SIMs associated with multi-receive among a plurality of SIMs.

13. A method for a multi-receive multi-subscriber identity module (SIM), the method comprising:
- determining a multi-standby mode or a multi-receive mode;
- assigning a plurality of fingers included in a rake receiver to a single SIM among two or more SIMs in the multi-standby mode;
- dividing the plurality of fingers into two or more finger groups when determining the multi-receive mode; and
- respectively assigning the two or more finger groups divided from the plurality of fingers to the two or more SIMs in the multi-receive mode,
- wherein the dividing of the plurality of fingers into the two or more finger groups comprises the plurality of fingers into the two or more finger groups based on space diversity through which signals associated with the two or more SIMs are received, wherein the rake receiver comprises a plurality of symbol combiners each of which is configured to generate a series of symbols by rake-combining signals provided from at least one of the plurality of fingers, and
- a first number of the plurality of symbol combiners is greater than a second number of channels required for one SIM.

14. The method of claim 13, further comprising detecting multiple paths, wherein the assigning of the plurality of fingers to the single SIM comprises allocating an arbitrary finger among the plurality of fingers to a first path that is detected, and the respectively assigning of the two or more finger groups to the two or more SIMs comprises allocating a finger belonging to a finger group to a second path that is detected, the finger group being assigned to a SIM of the two or more SIMs associated with the second path.

15. The method of claim 13, wherein the dividing of the plurality of fingers into the two or more finger groups comprises dividing the plurality of fingers into the two or more finger groups based on a number of radio links required for each of the two or more SIMs.

16. The method of claim 13, wherein the determining of the multi-standby mode or the multi-receive mode comprises determining whether to enter the multi-receive mode, based on at least one of channels required for the two or more SIMs, or a capability of a radio frequency integrated circuit (RFIC) that provides a baseband signal from an RF-band signal received through an antenna.

17. The method of claim 13, wherein the determining of the multi-standby mode or the multi-receive mode comprises:
- determining entry to the multi-standby mode when at least two SIMs among the two or more SIMs correspond to a connection state; and
- determining entry to the multi-receive mode when a maximum of one SIM among the two or more SIMs corresponds to the connection state, and the remaining SIM(s) correspond to an idle state.

18. A multi-subscriber identity module (SIM) terminal for multi-receive, the multi-SIM terminal comprising:
- a plurality of SIMs;
- a radio frequency integrated circuit (RFIC) configured to generate, from an RF-band signal received through an antenna, a baseband signal corresponding to a single SIM among the plurality of SIMs in a multi-standby mode and baseband signals corresponding to two or more SIMs of the plurality of SIMs in multi-receive mode; and
- a baseband processor comprising a rake receiver including a plurality of fingers and configured to respectively assign two or more finger groups divided from the plurality of fingers to the two or more SIMs in the multi-receive mode,
- wherein the baseband processor is, in the multi-receive mode, further configured to divide the plurality of fingers into the two or more finger groups based on space diversity through which signals associated with the two or more SIMs are received,
- wherein the rake receiver comprises a plurality of symbol combiners each of which is configured to generate a series of symbols by rake-combining signals provided from at least one of the plurality of fingers, and
- a first number of the plurality of symbol combiners is greater than a second number of channels required for one SIM.

* * * * *